May 26, 1953   V. S. DANIELSON   2,639,821
FRICTION SHOCK ABSORBING MECHANISM
FOR RAILWAY DRAFT RIGGINGS
Filed Dec. 17, 1948   2 Sheets-Sheet 1
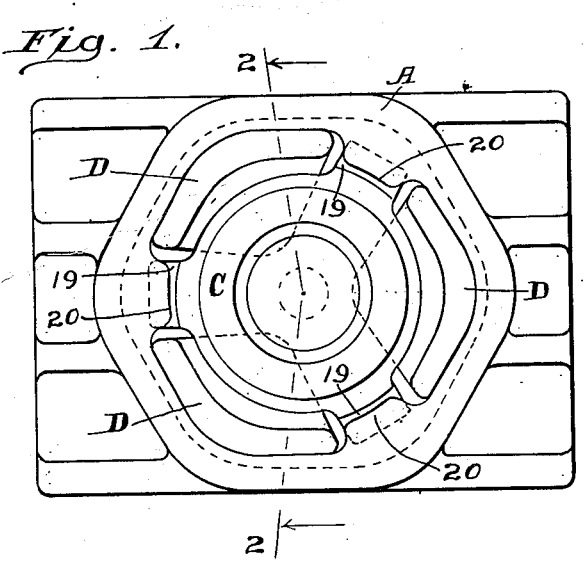
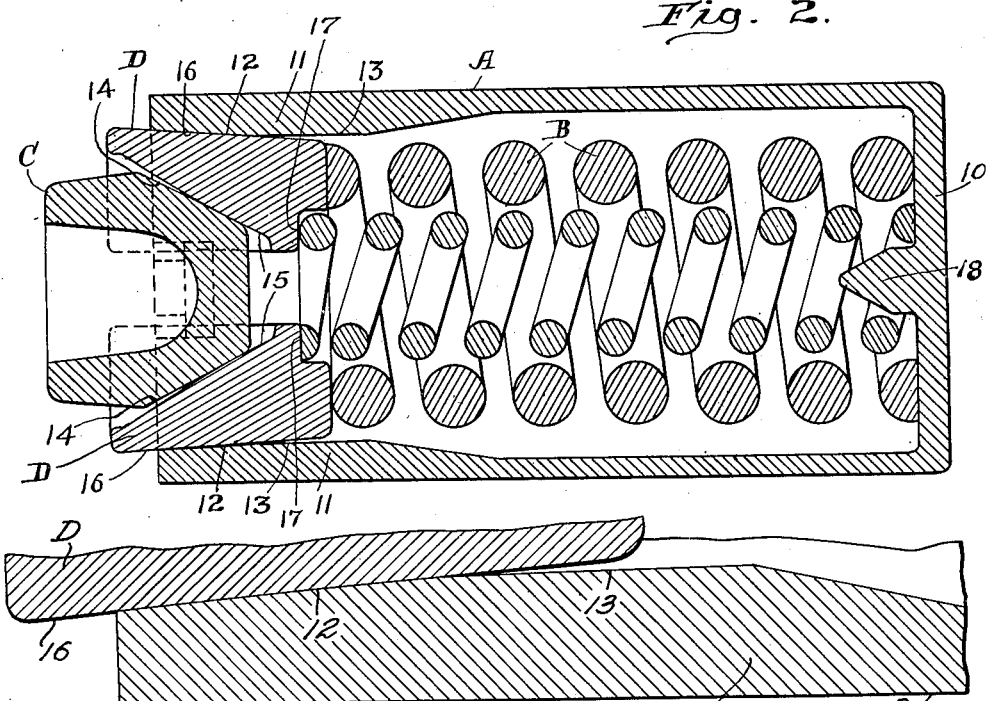
Inventor:
Vernon S. Danielson.
By
Henry Fuchs.
Atty.

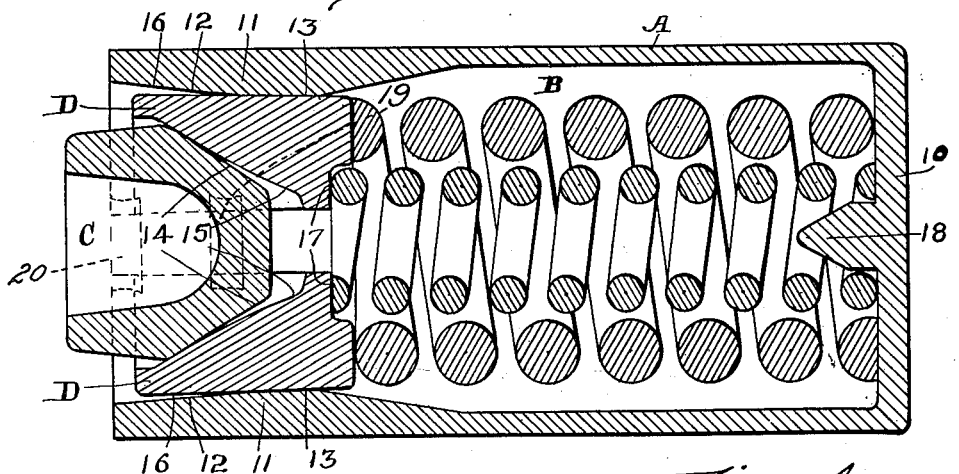
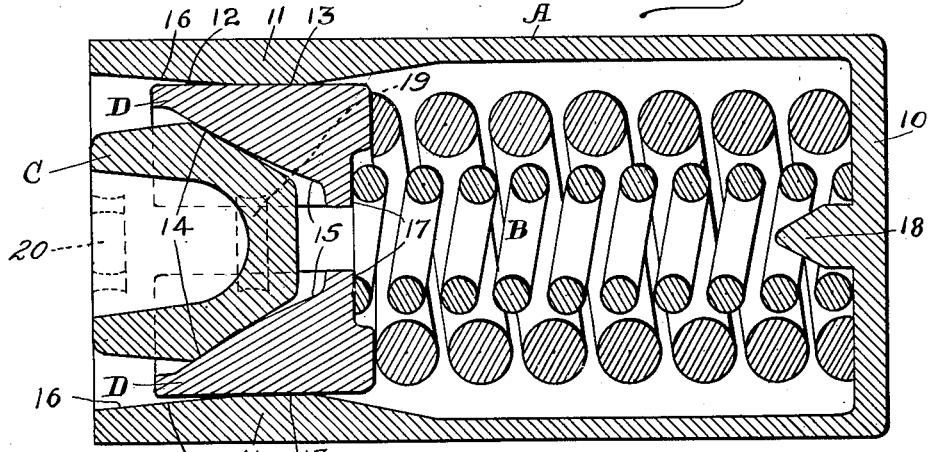
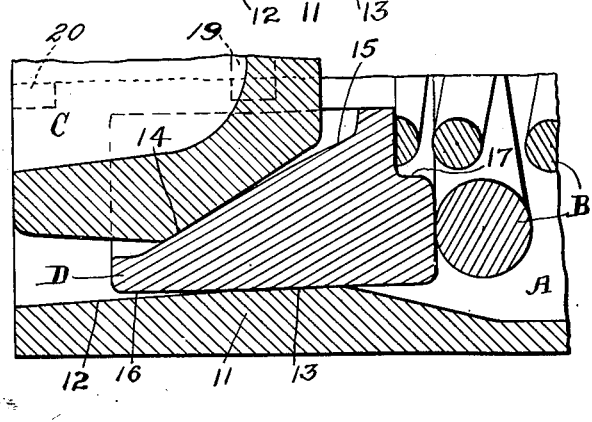

Patented May 26, 1953

2,639,821

UNITED STATES PATENT OFFICE 2,639,821

FRICTION SHOCK ABSORBING MECHANISM FOR RAILWAY DRAFT RIGGINGS

Vernon S. Danielson, Dolton, Ill., assignor to W. H. Miner, Inc., Chicago, Ill., a corporation of Delaware Application December 17, 1948, Serial No. 65,840

8 Claims. (Cl. 213—34)

1

This invention relates to improvements in friction shock absorbing mechanisms, especially adapted for draft riggings of railway cars.

One object of the invention is to provide a friction shock absorbing mechanism having progressively increasing frictional resistance built up during the first part of the compression stroke, which built up resistance remains substantially constant during the remainder of the stroke.

A further object of the invention is to provide a mechanism, as set forth in the preceding paragraph, comprising a friction casing, and a spring resisted friction clutch slidingly telescoped withing the casing, wherein the clutch comprises a central wedge member surrounded by friction shoes which have rocking adjustment with respect to the wedge member, and wherein the friction casing is provided with a set of interior friction surfaces at its front end which converge inwardly of the casing to a marked degree and with which the friction shoes cooperate during the first part of the compression stroke to produce the marked, progressively increasing frictional resistance, and the casing is further provided with a second set of friction surfaces which form continuations of said first named set, but converge only very slightly and function substantially in the manner of surfaces which are parallel to the central axis of the casing and with which the shoes engage during the last part of the compression stroke by automatic rocking adjustment thereof with respect to the wedge to produce the substantially uniform resistance which is had during the last part of the compression stroke.

Other objects of the invention will more clearly appear from the description and claims hereinafter following.

In the accompanying drawings forming a part of this specification, Figure 1 is a front elevational view of the improved friction shock absorbing mechanism. Figure 2 is a longitudinal, vertical sectional view, corresponding substantially to the offset line 2—2 of Figure 1. Figure 3 is a view, similar to Figure 2, showing the mechanism partly compressed. Figure 4 is a view, similar to Figure 2, showing the mechanism fully compressed. Figure 5 is a broken view, similar to Figure 4, showing the parts on an enlarged scale. Figure 6 is a broken view, similar to Figure 2, showing the left hand lower end portion of the shell and cooperating shoes, said view being on a greatly enlarged scale to illustrate the arrangement of friction surfaces.

The improved shock absorbing mechanism, as shown in the drawings, comprises broadly a friction casing A, a spring resistance B, a wedge block C, and three friction shoes D—D—D.

The friction casing A is in the form of a tubular member of hexagonal, transverse cross section, closed at the rear end by a transverse vertical wall 10 and open at its front end. The side walls of the casing are inwardly thickened at the open front end thereof, as indicated at 11. The thickened portion 11 of the casing presents a set of three interior front friction surfaces 12—12—12, and a set of rear friction surfaces 13—13—13, each friction surface 13 being longitudinaly aligned with and forming a continuation of the corresponding front surface 12. The friction surfaces 12—12—12 and 13—13—13 are all of V-shaped, transverse cross section, each surface 12 and the corresponding, longitudinally aligned surface 13 being formed on two adjacent converging walls of the hexagonal casing. The surfaces 12—12—12 converge inwardly of the mechanism to a marked extent, thus defining an opening of inwardly tapered formation, the degree of inclination of these surfaces with respect to the longitudinal central axis of the mechanism being preferably $\tfrac{5}{16}$ of an inch or more in six inches. The surfaces 13—13—13, which form continuations of the surfaces 12—12—12 converge only very slightly inwardly of the mechanism, the degree of inclination thereof with respect to the longitudinal central axis of the mechanism being preferably $\tfrac{1}{8}$ of an inch or less in six inches. Thus, the front and rear sets of friction surfaces 12 and 13 are angularly disposed with respect to each other lengthwise of the mechanism, as most clearly shown in Figure 6, the surfaces 12 being markedly inclined with respect to the longitudinal central axis of the mechanism, and the surfaces 13 being so slightly inclined as to approach a substantially parallel relation with respect to said axis.

The wedge C is in the form of a block having three inwardly converging wedge faces 14—14—14 of V-shaped, transverse cross section at its inner end, arranged symmetrically about the longitudinal central axis of the mechanism. The forward or outer end of the wedge block has flat engagement with the usual front follower, not shown, of the railway draft rigging to receive the actuating force.

The three friction shoes D—D—D are arranged symmetrically about the wedge block C and each shoe has a V-shaped wedge face 15 on its inner side, correspondingly inclined to and engaging with the corresponding wedge face 14 of the wedge block. Each of the two laterally diverging sections of the wedge face 15 of each shoe is slightly crowned in lengthwise direction, that is, slightly rounded lengthwise, thus providing for rocking adjustment of each shoe on the wedge.

On the outer side, each shoe has a lengthwise extending, V-shaped friction surface 16, which is engageable with the corresponding front and rear friction surfaces 12 and 13 of the casing. The two laterally diverging sections of the V-shaped friction surface 16 are flat throughout the length of the shoe.

The spring resistance B is disposed within the casing A, being interposed between the rear ends of the shoes D—D—D and the rear wall 10 of the casing. This spring resistance comprises an outer heavy helical coil, bearing at its front end on the shoes, and a relatively lighter inner helical coil extending into seats 17—17—17 provided at the inner ends of the shoes. The rear end of the inner coil is centered by an inwardly projecting tapered boss 18 on the end wall 10 of the casing.

To limit outward movement of the wedge block C, well-known means is provided, comprising radially projecting lugs 19—19—19 on the wedge block engageable behind inwardly projecting stop lugs 20—20—20 on the casing.

The operation of my improved shock absorbing mechanism is as follows: Upon compression of the mechanism, the wedge C is forced inwardly of the casing A, spreading the shoes D—D—D apart and sliding the same inwardly of the casing against the resistance of the spring B, thereby absorbing the shocks by frictional sliding engagement of the shoes with the interior friction surfaces of the casing. During the first part of the compression stroke, the shoes slide on the inwardly converging friction surfaces 12—12—12 of the casing, thereby providing progressively increasing frictional resistance. This frictional resistance continues to build up as the shoes ride inwardly on the surfaces 12—12—12 until the rear ends of the shoes have been projected a sufficient distance beyond the rear ends of the surfaces 12—12—12 to rock on the fulcrum formed by the junction of the surfaces 12—12—12 with the surfaces 13—13—13, and be forced into engagement with the surfaces 13—13—13, as shown in Figure 3. This rocking movement with respect to the wedge block is permitted by the crowned or rounded contour of the wedge faces of the shoes. During the remainder of the compression stroke, the shoes ride on the surfaces 13—13—13, thereby providing substantially constant frictional resistance during the remainder of the compression stroke, which resistance is approximately equal to the maximum built up by the action of the converging surfaces 12—12—12. In this connection, it is pointed out that although the friction surfaces 13—13—13 converge slightly, there is no substantial increase in frictional resistance during sliding movement of the shoes on these surfaces, the slight taper provided by these surfaces being employed merely to assure that there will be no decrease or drop in the resistance afforded, which might occur if these surfaces were made precisely parallel to the longitudinal axis of the mechanism. This taper is so slight that, for all practical purposes, the frictional resistance remains substantially constant during the last part of the compression stroke of the mechanism. Compression of the mechanism is limited by engagement of the front follower of the draft rigging with the outer end of the casing, the wedge block having been forced inwardly to its full extent, as shown in Figures 4 and 5.

When the actuating force is reduced or removed, the parts of the mechanism are returned to the full release position shown in Figure 2 by the expansive action of the spring resistance B.

I claim:

1. In a friction shock absorbing mechanism, the combination with a friction casing open at one end, said casing having an interior set of longitudinally extending, straight friction surfaces at its open end, and a second set of interior longitudinally extending, straight friction surfaces inwardly of said first named set, forming continuations of the latter, the surfaces of said first named set diverging outwardly of the casing and being inclined outwardly away from said second named set; of friction shoes slidable within said casing and engageable with said first and second named sets of friction surfaces in succession; a wedge pressure transmitting member, said wedge pressure transmitting member and said shoes having cooperating sets of wedge faces, one face of each set being crowned to provide for rocking movement of the shoes on said wedge pressure transmitting member; and spring means within the casing yieldingly opposing inward movement of the shoes.

2. In a friction shock absorbing mechanism, the combination with a friction casing open at one end, said casing having an interior set of longitudinally extending, straight friction surfaces at its open end, and second set of interior longitudinally extending, straight friction surfaces inwardly of said first named set, forming continuations of the latter, said first named set converging inwardly of the casing and with respect to said second named set; of friction shoes slidable within the casing and engageable with said first and second named sets of surfaces in succession; a wedge pressure transmitting member, said wedge pressure transmitting member and said shoes having cooperating sets of wedge faces, one face of each set being crowned to provide for rocking movement of the shoes on said wedge pressure transmitting member; and spring means within the casing yieldingly opposing inward movement of the shoes.

3. In a friction shock absorbing mechanism, the combination with a friction casing open at one end, said casing having an interior, inwardly converging set of longitudinally extending, straight friction surfaces at its open end, and a second set of interior, inwardly converging longitudinally extending, straight friction surfaces inwardly of said first named set, forming continuations of the latter, the surfaces of said first named set converging to a greater degree than the surfaces of the second named set; of friction shoes slidable within said casing and engageable with said first and second named sets of surfaces in succesion; a wedge pressure transmitting member, said wedge pressure transmitting member and said shoes having cooperating sets of wedge faces, one face of each set being crowned to provide for rocking movement of the shoes on said wedge pressure transmitting member; and spring means yieldingly opposing inward movement of the shoes.

4. In a friction shock absorbing mechanism, the combination with a column element having a set of lengthwise extending, straight friction surfaces at its outer end, and a second set of lengthwise extending, straight friction surfaces inwardly of said first named surfaces, forming continuations of the latter, the surfaces of said first named set being inclined with respect to the central longitudinal axis of the mechanism and with respect to said second named set; of friction shoes slidable on said column element and engageable with said first and second named sets of surfaces in succession; a wedge pressure transmitting member, said wedge pressure transmitting member and said shoes having cooperating sets of wedge faces, one face of each set being crowned to provide for rocking movement of the shoes on said wedge pressure transmitting member; and spring means within the casing yieldingly opposing inward movement of the shoes.

5. In a friction shock absorbing mechanism, the combination with a friction member having a lengthwise extending, straight friction surface at its outer end and a second lengthwise extending, straight friction surface inwardly of said first named surface and forming a continuation thereof, said first named surface being inclined with respect to the longitudinal central axis of the mechanism and with respect to said second named surface; of a friction shoe slidable lengthwise on said friction member and engageable with said first and second named surfaces in succession; a wedge pressure transmitting member, said wedge pressure transmitting member and shoe having a set of cooperating wedge faces thereon, one face of said set being crowned to provide for rocking movement of the shoe on said wedge pressure transmitting member; and spring means opposing inward movement of said shoe lengthwise of the friction member.

6. In a friction shock absorbing mechanism, the combination with a friction casing open at one end, said casing having an interior set of lengthwise extending, straight friction surfaces at its open end, and a second set of interior lengthwise extending, straight friction surfaces inwardly of said first named set, forming continuations of the latter, the surfaces of said first named set diverging outwardly of the casing and being inclined outwardly away from said second named set; of friction shoes slidable within said casing and engageable with said first and second named sets of friction surfaces in succession; a wedge pressure transmitting member, said wedge member and shoes having cooperating wedge faces, the wedge faces of said shoes being rounded to provide for rocking adjustment of said shoes on said wedge member; and spring means within the casing yieldingly opposing inward movement of the shoes.

7. In a friction shock absorbing mechanism, the combination with a friction casing open at one end, said casing having an interior set of lengthwise extending, straight friction surfaces at its open end, and a second set of interior lengthwise extending, straight friction surfaces inwardly of said first named set, forming continuations of the latter, said first named set converging inwardly of the casing and with respect to said second named set; of friction shoes slidable within the casing and engageable with said first and second named sets of surfaces in succession; a wedge pressure transmitting member, said wedge member and shoes having cooperating wedge faces, the wedge faces of said shoes being rounded to provide for rocking adjustment of said shoes on said wedge member; and spring means within the casing yieldingly opposing inward movement of the shoes.

8. In a friction shock absorbing mechanism, the combination with a friction casing open at one end, said casing having an interior, inwardly converging set of longitudinally extending, straight friction surfaces at its open end, and a second set of interior, inwardly converging longitudinally extending, straight friction surfaces inwardly of said first named set, forming continuations of the latter, the surfaces of said first named set converging to a greater degree than the surfaces of the second named set; of friction shoe members slidable within said casing and engageable with said first and second named sets of surfaces in succession; a wedge pressure transmitting member, said wedge member and shoe members having cooperating sets of wedge faces, one face of each set being crowned to provide for rocking adjustment of the shoe members on said wedge member; and spring means yieldingly opposing inward movement of the shoe members.

VERNON S. DANIELSON.

References Cited in the file of this patent

UNITED STATES PATENTS

| Number | Name | Date |
| --- | --- | --- |
| 1,730,214 | Johnson | Oct. 1, 1929 |
| 1,780,358 | Miner | Nov. 4, 1930 |
| 1,882,870 | Olander | Oct. 18, 1932 |
| 2,171,659 | Lehman | Sept. 5, 1939 |
| 2,196,315 | Lehman | Apr. 9, 1940 |
| 2,198,700 | Haseltine | Apr. 30, 1940 |